United States Patent [19]

Hsu et al.

[11] Patent Number: 5,016,971
[45] Date of Patent: May 21, 1991

[54] AUTOMATED LASER FUSION SYSTEM FOR HIGH STRENGTH OPTICAL FIBER SPLICING

[75] Inventors: Hui-Pin Hsu, Northridge; Soon Jang, Los Angeles; Lee R. Hinze, Simi Valley, all of Calif.

[73] Assignee: Hughes Aircraft Company, Los Angeles, Calif.

[21] Appl. No.: 424,794

[22] Filed: Oct. 20, 1989

[51] Int. Cl.$^5$ .............................................. G02B 6/38
[52] U.S. Cl. ............................ 350/96.21; 219/121.63; 350/96.2
[58] Field of Search ............... 350/96.21; 219/121.63, 219/121.64

[56] References Cited

U.S. PATENT DOCUMENTS

| | | | |
|---|---|---|---|
| 4,664,732 | 5/1987 | Campbell et al. | 350/96.21 X |
| 4,696,534 | 9/1987 | Saha | 350/96.21 X |
| 4,696,535 | 9/1987 | Saha | 350/96.21 X |
| 4,714,815 | 12/1987 | Swarts et al. | 219/121.63 |
| 4,802,729 | 2/1989 | Rivoallan et al. | 350/96.21 |
| 4,827,098 | 5/1989 | Kasner et al. | 219/121.63 |

Primary Examiner—John D. Lee
Assistant Examiner—Stephen W. Barns
Attorney, Agent, or Firm—R. M. Heald; C. D. Brown; W. K. Denson-Low

[57] ABSTRACT

An automated computer controlled process optical fiber splicing system 11 which yields consistent, high strength, low loss, high quality splices. The system of the invention includes a positioning system 17, 21, 29, and 31 for moving at least two optical fiber ends 15 and 19 into relative alignment at a junction 23. A high intensity beam of energy 37 is directed at the junction 23 of the fibers to achieve the high temperatures required for fusing the ends thereof. The focus of the beam 37 is adjusted to control the temperature profile of the energy applied to the junction 23.

10 Claims, 3 Drawing Sheets

AUTOMATED LASER FUSION SYSTEM FOR HIGH STRENGTH OPTICAL FIBER SPLICING

BACKGROUND OF THE INVENTION

1. Field of the Invention

The present invention relates to optical fiber technology. More specifically, the present invention relates to techniques for splicing optical fiber.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

At present, only a few optical fiber manufacturers have the capability of making long, high strength, low loss, high quality fibers. Accordingly, optical fiber splicing is required more and more frequently to meet certain demanding applications.

High strength, low loss optical fiber splicing requires: (1) proper fiber preparation, (2) proper fiber alignment prior to fusion, (3) the bringing together and mating of the fibers during the fusion process, and (4) application of a precise temperature profile during the fusion and post fusion annealing processes.

Control of the temperature profile is of particular importance. The temperature profile is the timing of the application of specific amounts of thermal energy for controlled durations. Fiber splicing with inadequate control of the temperature profile may result in thermal shock, i.e., structural damage to the fiber.

Conventional fiber splicing techniques include hydrogen/oxygen flame torching, H-Cl gas flame splicing, and electric arc fusing. Hydrogen/oxygen flame torching was not an automated process. The temperature of the fiber had to be controlled by the operator. Splice quality was inconsistent due to the dependence on the skill of the operator. It was also difficult to align and control the movement of the fibers with the precision necessary to achieve a low loss splice. Hence, hydrogen/oxygen flame torching suffered low yields of high strength, low loss, high quality optical fiber due to poor control of the temperature profile, alignment and movement of the fiber.

H-CI gas flame splicing was known to yield high strength splices, but H-CI gas was found to be extremely hazardous.

Electric arc fusing is an automated process by which a computer controlled fiber positioner aligns the fiber ends face-to-face until optimum transmission is achieved through the junction. A high voltage is applied to two electrodes creating electric art induced heat. With an appropriate temperature profile, the temperature of the fiber reaches the melting point of glass, surface tension pulls the fiber ends together and the ends are fused. With insufficient heat, the glass will not melt. With excessive heat, the fiber ends melt away from each other.

While effective in providing a high strength splice, electric arc fusing has certain shortcomings. First, as with torch and flame splicing, it is somewhat difficult to control the temperature profile with this technique. Secondly, the ionized air gases generated by the electrode, tend to contaminate the fusion surfaces. As a result of the above problems this technique tends to yield inconsistent results.

Thus, there is a need in the art for an optical fiber splicing system which affords better control of the splicing temperature without contamination. In addition, there is a need for a system which would apply fusion heat without disturbing the alignment of the fiber ends and without causing thermal shock to the fiber. Further, there is a need for a system which would provide consistent high strength, low optical loss fusion splicing.

SUMMARY OF THE INVENTION

The need in the art is addressed by the present invention which provides an improved optical fiber splicing system. The system of the invention includes a positioning system for moving two optical fiber ends into relative alignment at a junction. A high intensity beam of energy is directed at the junction of the fiber ends to achieve the temperatures required for fusing the ends. The focus of the beam is controlled to maintain the proper temperature profile of the energy density applied to the optical fiber junction.

The invention provides an automated computer controlled process which yields consistent, high strength, low loss, high quality splices.

DESCRIPTION OF THE INVENTION

Illustrative embodiments and exemplary applications will now be described with reference to the accompanying drawings to disclose the advantageous teachings of the present invention.

Figure 1:
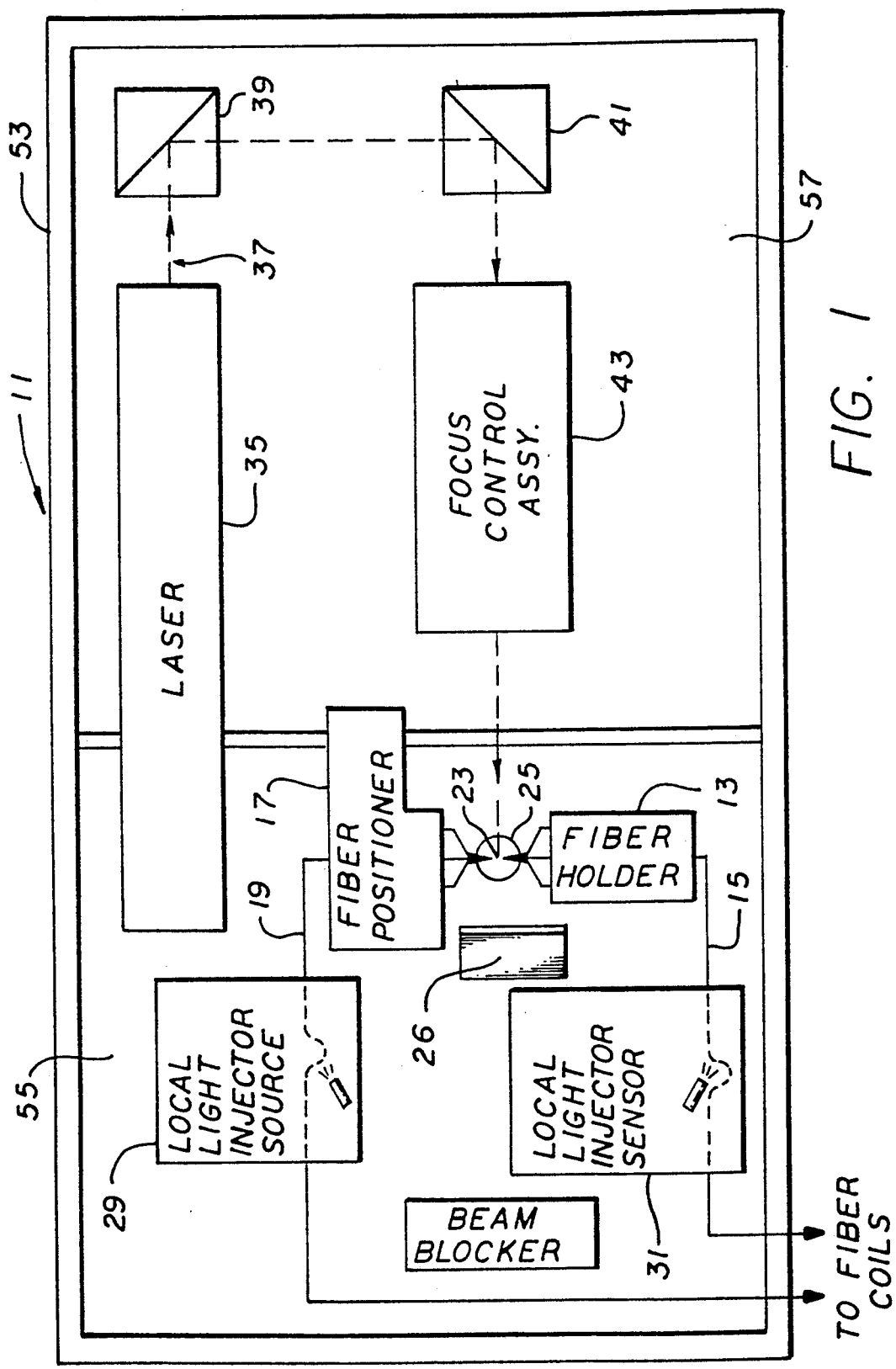
FIG. 1 is an operational block diagram of the optical fiber splicing system of the present invention.

FIG. 1 is an operational block diagram of the optical fiber splicing system 11 of the present invention. The system 11 includes a fiber holder 13 which holds, for splicing, an end of a first coil of optical fiber 15. An xyz fiber positioner 17 is included for holding an end of a second coil of optical fiber 19. The fiber holder 13, xyz positioner 17 and associated controller 21 (not shown) are of conventional design and may be purchased from such manufacturers as the Klinger Scientific Company.

The end of the fibers 15 and 19 are moved into a coarse face-to-face coaxial longitudinal alignment at a junction 23 over a microscope objective 25 by the controller 21. An image is provided by the microscope 25 which is displayed on a television monitor 27 (not shown). A first 45 degree mirror 26 allows for a viewing, through the microscope 25, of the fiber ends at the junction 23 from a second angle.

The second fiber 19 is fed to the fiber positioner 17 through a local light injector source 29. The first fiber 15 is fed to the fiber holder 13 through a local light injector sensor 31. The local light injection source and sensor are of conventional design and may be purchased from such manufacturers as the Ando Corporation of Japan. During the alignment of the fibers prior to splicing of same, the local light source injects an optical signal into the second fiber 19 which is transmitted thereby over the junction 23 into the first fiber 15. The optical signal strength in the first fiber 15 is detected by the local light injector sensor 31. The injector sensor 31 provides an electrical signal, indicative of the signal strength in the first fiber 15, to the xyz fiber positioning controller 21 via an interface controller 33 (not shown). A coarse alignment is provided by the xyz fiber positioner 17, controlled manually by the operator via the TV monitor and the local light injector readout, while a fine or precise alignment is accomplished by the preprogrammed controller 21 and the fiber positioning system including the injector source 29, sensor 31 and xyz positioner 17. That is, the suitably programmed controller 21 commands the fiber positioner 17 to bring the fibers together and to begin to align the fibers so that the lowest loss is obtained.

After the fibers are in precise alignment, in accordance with the present teachings, the fusing of the fibers 15 and 19 is accomplished by directing a high intensity beam of energy at the junction 23 of the fibers and controlling the focus of the beam to provide an optimum temperature profile of the energy applied to the splice. The beam 37 is provided by a laser 35. In the preferred embodiment, the laser 35 is a conventional 5 watt CW (continuous wave) $CO_2$ laser operating at the 10.2 micron wavelength necessary to heat the fibers.

Figure 2:
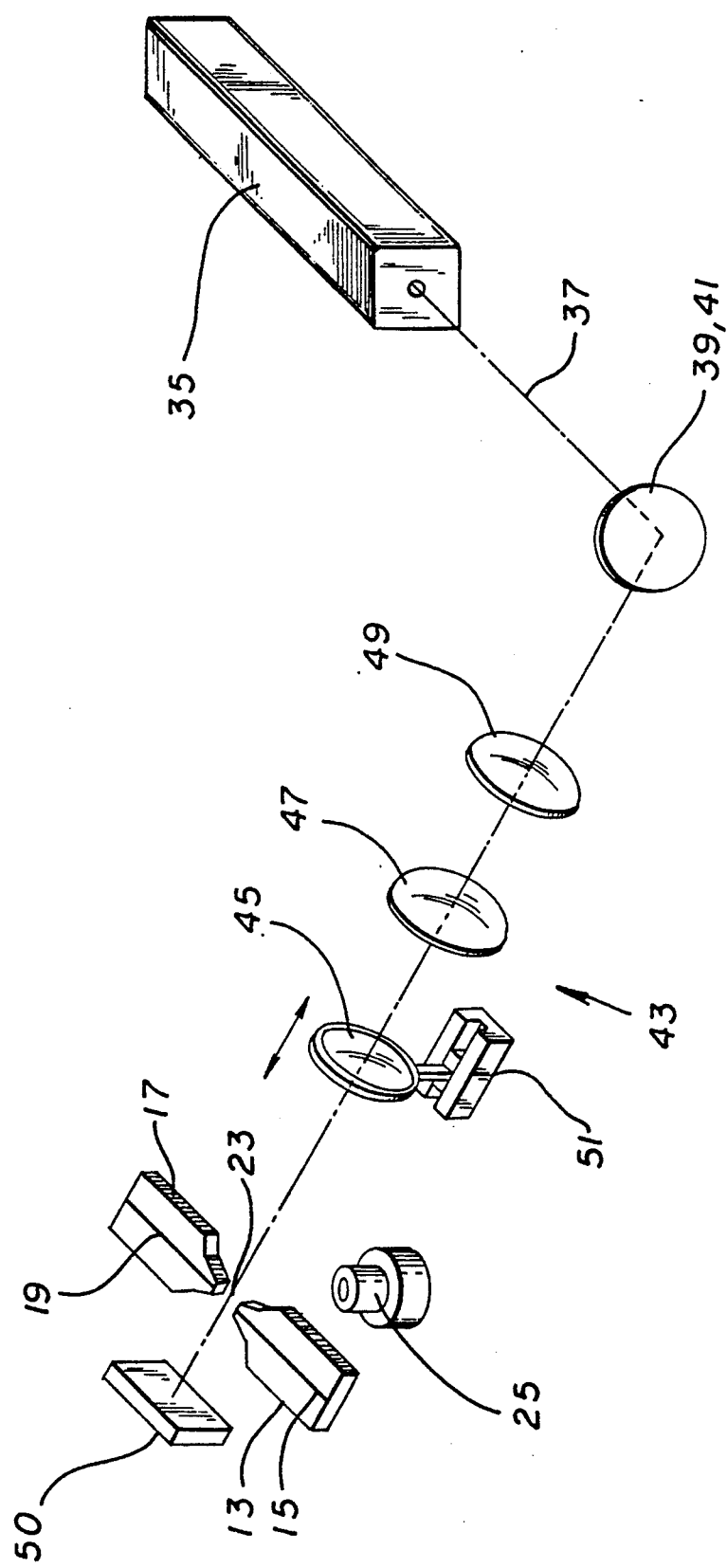
FIG. 2 is a simplified perspective diagram of the optical fiber splicing system of the present invention.

The laser beam 37 is directed to the splicing junction 23 by second and third 45 degree mirrors 39 and 41 through a focus control assembly 43. As illustrated in the diagram of FIG. 2, the focus control assembly 43 includes a first movable lens 45, and second and third stationary lens 47 and 49. The position of the first lens 45 is controlled by the position controller 21 through a translation table and the selective activation of a D.C. motor 51. The motor 51 is shown as a block to illustrate that alternative lens actuation schemes may be used without departing from the scope of the present invention. For example, a coaxial type motor drive may be used to position the lens within the scope of the present teachings.

During the fusion process, the controller program commands the fiber positioner 17 to bring the fibers closer together. Heating continues and the temperature decreases as a result of the controller 21 moving the lens 45. After the completion of the fusion process, the operator simply removes the fibers from the holders.

FIG. 2 also illustrates the location of the microscope objective 25 relative to the fiber holder 13 and the fiber positioner 17. The longitudinal axis of the beam 37 is transverse to the longitudinal axes of the fibers 15 and 19. The laser beam 37 is dumped into a beam blocker 50 such as a fire brick.

Thus, as energy from the beam is applied to the fibers 15 and 19 at the junction 23, the lens 45 is moved to change the focus thereof to provide an optimum temperature profile for the fibers being spliced. One of ordinary skill in the art will be able to determine desired spot size and temperature profile used by the controller 21 to provide optimum control of the lens position during the splicing process.

The controller includes a microprocessor which executes a simple servo control program to provide control signals to the motor 51 effective to position the lens 45 to provide the desired beam spot size and hence an optimum temperature profile. In the preferred embodiment, the control program was written in basic.

Figure 3:
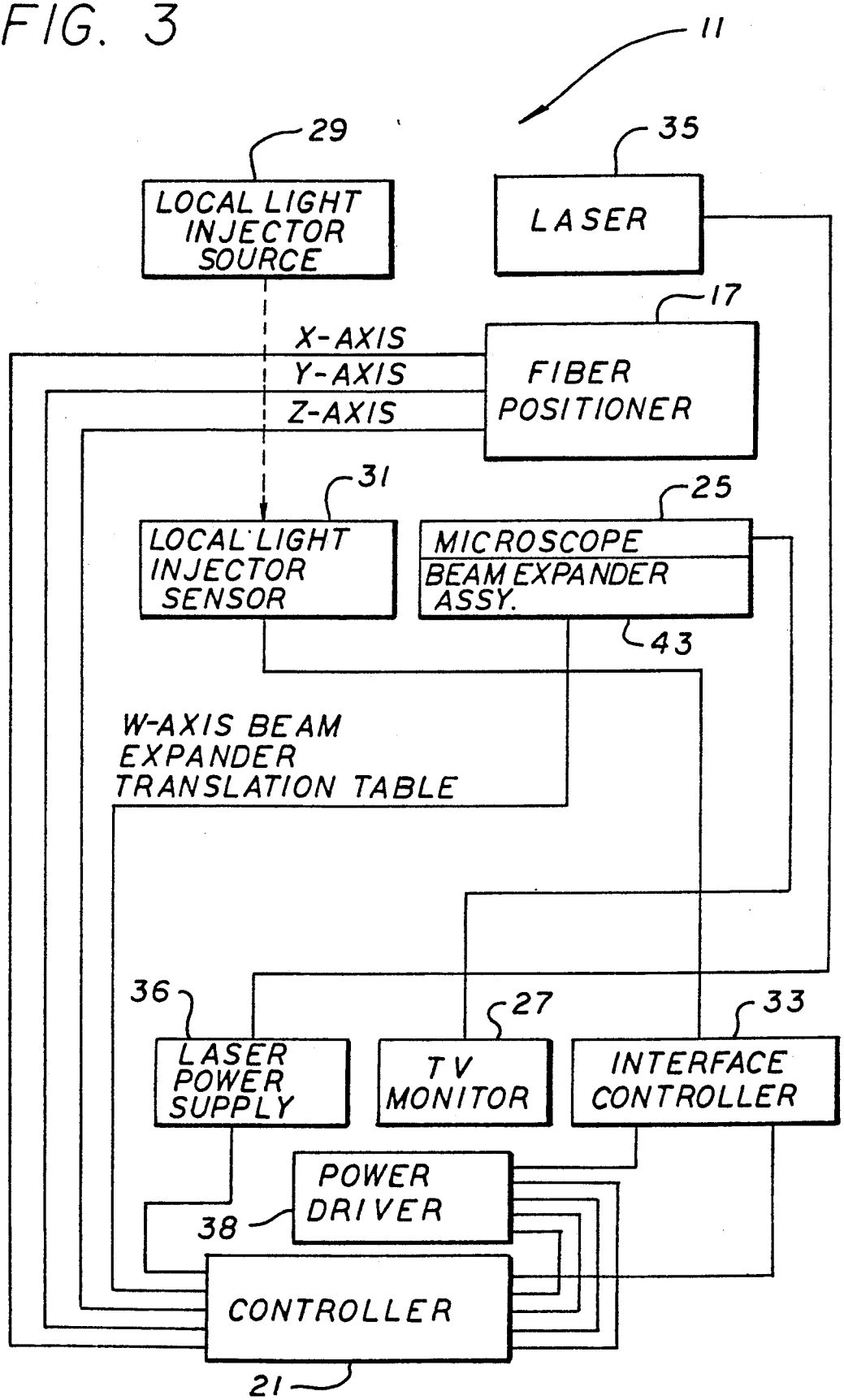
FIG. 3 is a block diagram showing the electrical connections between the central components of the system of the present invention.

FIG. 3 is a block diagram showing the electrical connections between the central components of the system 11 of the present invention. Four channels of output are provided by the controller 21, three to control the three stepper motors which provide x, y, and z axis positioning of the fiber positioner 17, and one to control the axial movement of the first lens 45 of the focus control assembly 43.

The laser 35 is powered by a laser power supply 36 which is switched by the controller 21. The position controller 21 and the interface controller 33 receive power from a conventional power driver 38. Other power supplies and power connections have been omitted for the purpose of illustration. Those skilled in the art will be able to provide the necessary power connections for each of the components shown. Optimal alignment data from the local light sensor 31 is provided to the controller 21 through the interface controller 33 to signal the initiation of the fusion process.

Prior to splicing, the fibers should be prepared in a suitable conventional manner. The temperature profile should include a prefusing step during which the fibers are exposed to lower temperatures to burn off dust and other particles deposited on the surface of the fiber. Post fusion annealing and annealing steps should also be included within the profile to minimize thermal shock. In a post fusion annealing step, the beam spot size may be increased to four to five fiber diameters about the spliced junction. This allows a gradual cooling to reduce heat stress. During the annealing step, the spot size may be increased to 10-15 fiber diameters for further controlled cooling. The temperature profile depends on individual characteristic of the optical fiber.

The system 11 is enclosed within a cabinet 53 having hinged covers 55 and 57. An electrical interlock (not shown) disconnects power to the laser 35 and activates a mechanism (not shown) which moves the first mirror 26 into and out of operational position on the opening and closure of the covers 55 and 57.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An optical fiber splicing system comprising:
   positioning means for moving end portions of at least two optical fibers until said portions are in relative alignment at a junction;
   means for directing a high intensity beam of energy along a beam path intersecting said junction; and
   focus control means for controlling the focus of said beam and thereby controlling a temperature profile of the energy at said junction; said focus control means including a first lens intersecting and selectively movable along said beam path for adjusting said temperature profile at said junction, as needed during the splicing process thereby splicing said at least-two optical fibers into a single optical fiber.

2. The invention of claim 1 wherein said focus control means includes:
   motor means operatively connected to said first lens for selectively moving said first lens along said beam path toward and away from said junction; and controller means for selectively activating said motor means.

3. The invention of claim 2 wherein said focus control means further includes second and third lenses in optical alignment with said first lens.

4. The invention of claim 1 wherein said positioning means includes light source means for injecting optical energy through a first one of said optical fibers and into a second one of said optical fibers through said relatively aligned end portions.

5. The invention of claim 4 wherein said positioning means includes means for sensing optical energy in said second one of said optical fibers.

6. The invention of claim 1 wherein said positioning means includes a monitor for providing an indication of the relative positions of the end portions of said optical fibers.

7. An optical fiber splicing system comprising:
positioning means for moving end portions of at least two optical fibers until said end portions are in relative alignment at a junction, said positioning means including light source means for injecting light through a first one of said aligned fibers and means for sensing the optical energy in a second one of said aligned fibers;
means for directing a high intensity beam of energy along a path intersecting said junction; and
focus control means for controlling the focus of said beam and thereby controlling a temperature profile of the energy at said junction, said focus control means including a first lens intersecting and movable along the path of said beam, motor means for moving said first lens along the path of said beam and controller means for selectively activating said motor means to move said first lens thereby altering said temperature profile as needed during the splicing operation.

8. The invention of claim 7 wherein said focus control means includes second and third lenses in optical alignment with said first lens.

9. The invention of claim 7 wherein said positioning means includes a monitor for providing an indication of the relative positions of the end portions of said optical fibers.

10. A method for splicing end portions of at least two optical fibers including the steps of:
(a) positioning end portions of each of at least two optical fibers in relative alignment at a junction;
(b) injecting optical energy through said optical fibers to precisely align the fiber end portions at the junctions;
(c) directing a high intensity beam of energy at said junction to splice at least two optical fibers together;
(d) altering the focus of said beam at said junction, during the splicing operation as needed, to optimize a temperature profile of the energy applied to the fiber end portions at said junction, thereby forming a single, resultant optical fiber from said at least two optical fibers aligned at said junction.

* * * * *

UNITED STATES PATENT AND TRADEMARK OFFICE
CERTIFICATE OF CORRECTION

PATENT NO. : 5,016,971

DATED : May 21, 1991

INVENTOR(S) : Hui-Pin Hsu    Soon Jang    Lee R. Hinze

It is certified that error appears in the above-identified patent and that said Letters Patent is hereby corrected as shown below:

Column 4, line 53,  instead of "said portions"
                    insert -- said end portions --

Signed and Sealed this

Fifth Day of January, 1993

Attest:

DOUGLAS B. COMER

*Attesting Officer*    Acting Commissioner of Patents and Trademarks